Dec. 18, 1962  J. J. McLAUGHLIN  3,068,983
CANTILEVER TELESCOPIC CONVEYOR
Filed May 27, 1959  5 Sheets-Sheet 1
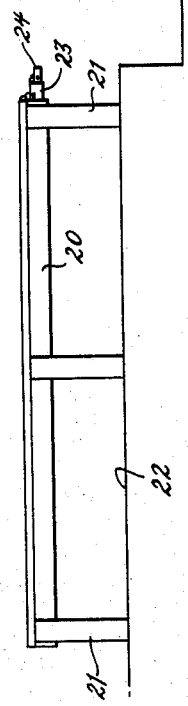
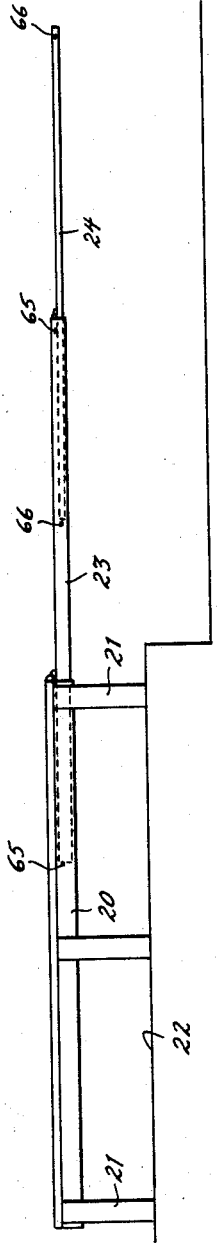
INVENTOR
JOHN J. McLAUGHLIN
BY
ATTORNEYS Dec. 18, 1962     J. J. McLAUGHLIN     3,068,983
CANTILEVER TELESCOPIC CONVEYOR
Filed May 27, 1959                             5 Sheets-Sheet 2
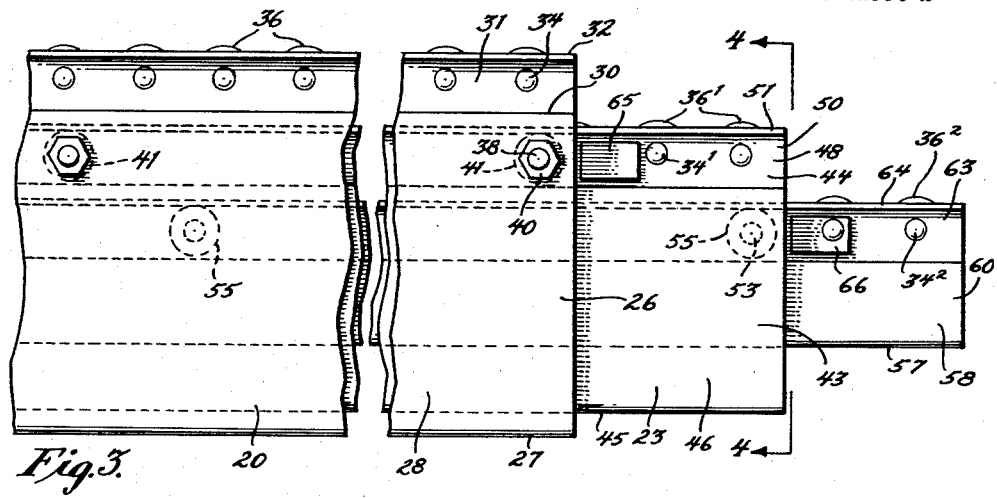
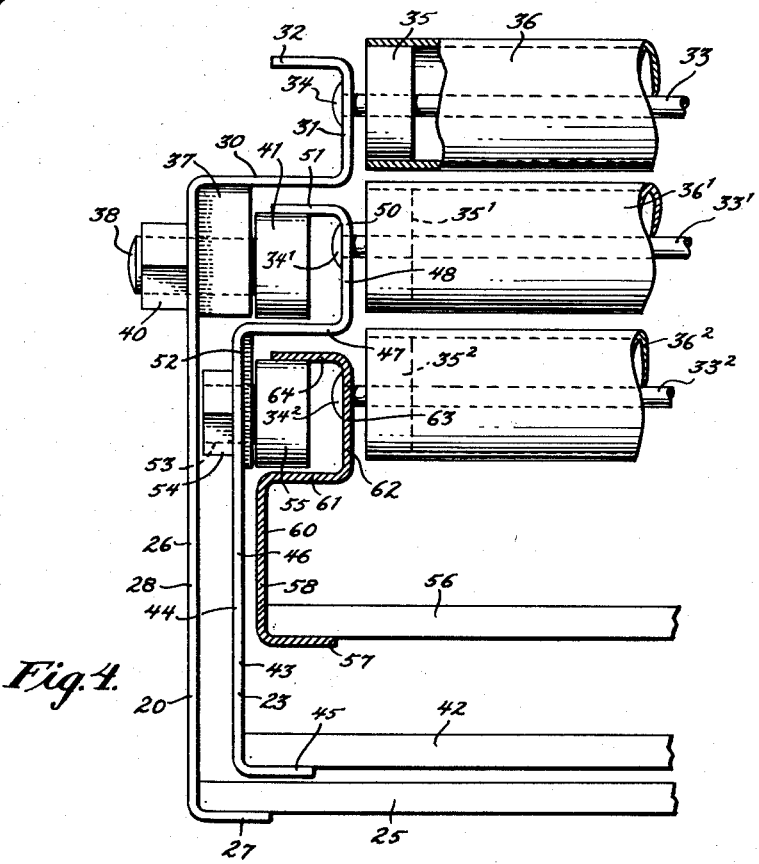
INVENTOR
JOHN J. McLAUGHLIN
BY
ATTORNEYS

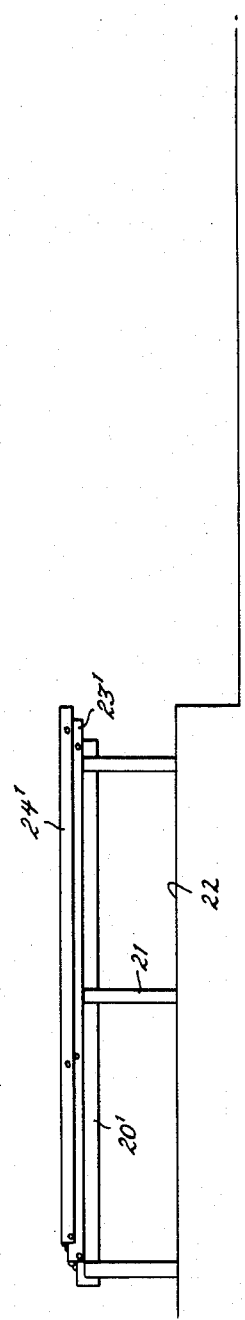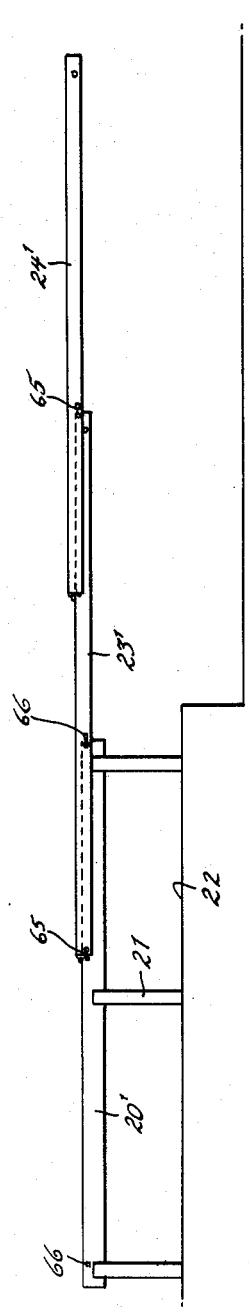

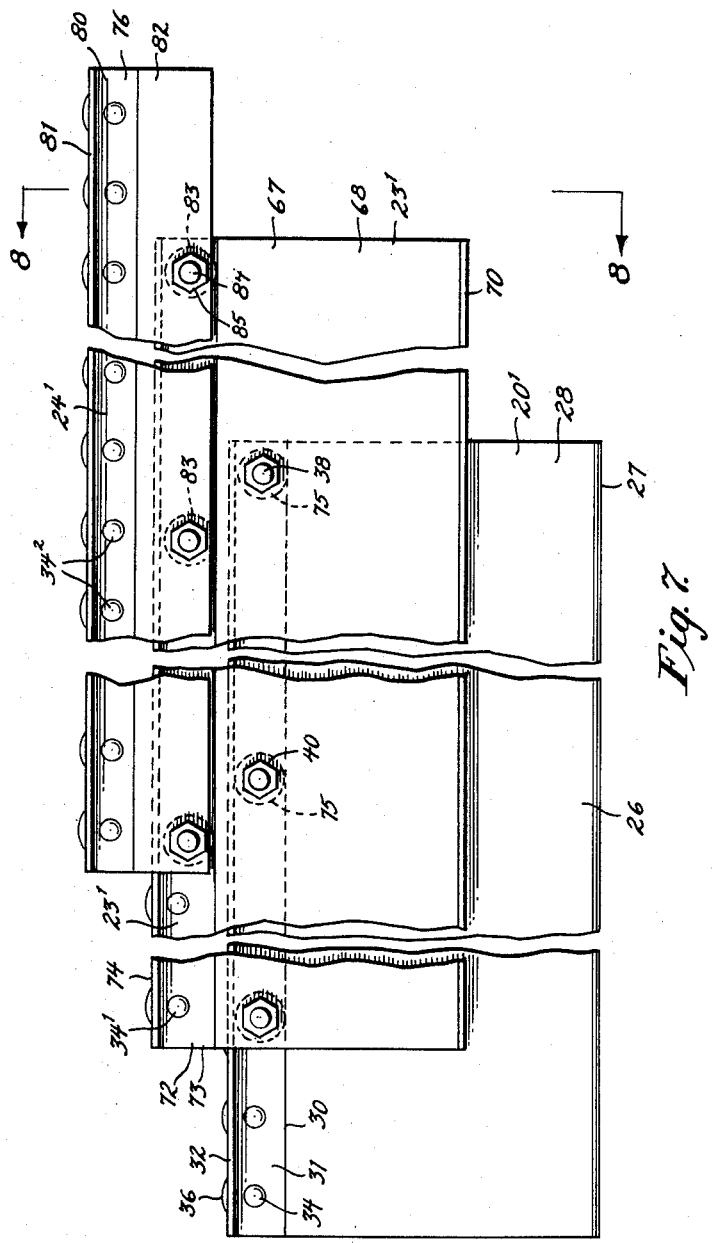

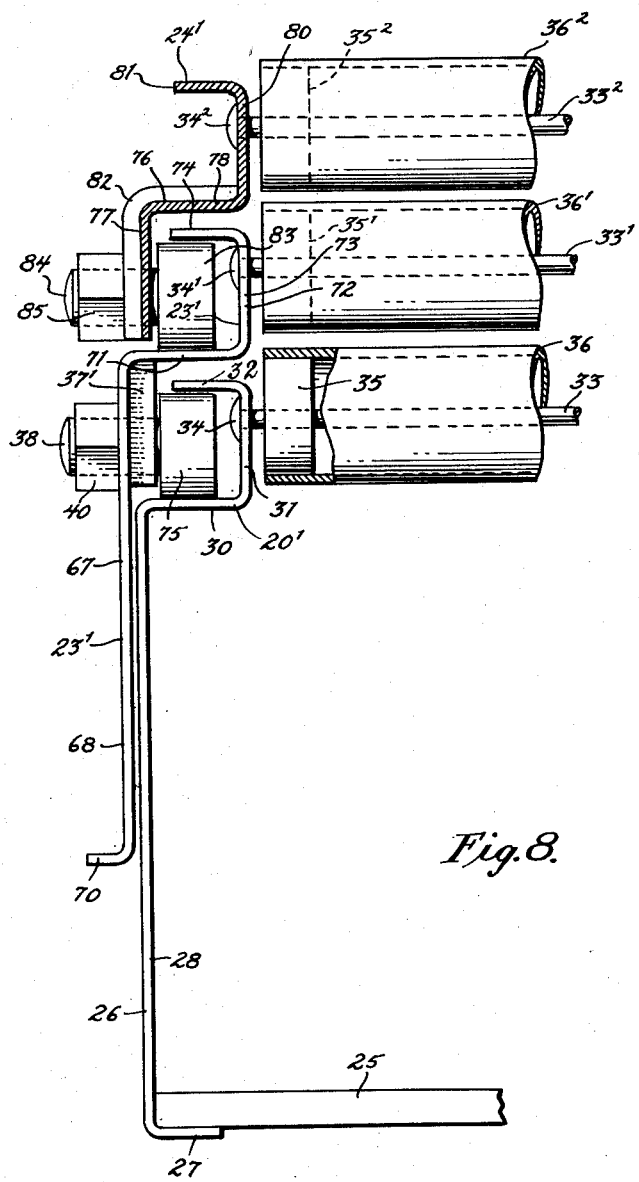

3,068,983
CANTILEVER TELESCOPIC CONVEYOR
John J. McLaughlin, Norwood, Pa., assignor to The Wilkie Company, Ellwood City, Pa., a corporation of Pennsylvania
Filed May 27, 1959, Ser. No. 816,153
9 Claims. (Cl. 193—35)

The present invention relates to cantilever telescopic conveyers of the type which can be used for loading, unloading and the like of objects, packages and similar materials.

A purpose of the invention is to permit extension of the conveyer into a vehicle without requiring that any support be provided by the floor of the vehicle.

A further purpose is to provide telescoping one, two and three sections of a gravity conveyer which is provided with gravity operated rollers on each of the sections so that an object moving on the conveyer can move from end to end, all of the sections being supported by one of the sections.

A further purpose is to provide uniform width of cantilever conveyer sections notwithstanding that one section is mounted on another.

A further purpose is to provide on the cantilever conveyer section, elements which extend around other sections, and then extend to an inner position at which they provide upper and lower tracks.

A further purpose is to combine in each conveyer section, a web which is adapted to extend adjacent the support of another section, and also an outwardly directed channel which gives upper and lower rail support for roller elements.

Further purposes appear in the specification and in the claims.

In the drawings I have chosen to illustrate a few only of the numerous embodiments in which my invention may appear, selecting the forms shown from the standpoints of convenience in illustration, satisfactory operation and clear demonstration of the principles involved.

FIGURE 1 is a side elevation of a truck dock showing the conveyer of the invention in retracted position.

FIGURE 2 is a view similar to FIGURE 1 showing the conveyer of the invention fully extended.

FIGURE 3 is a broken enlarged side elevation, showing the channel shapes employed in the invention.

FIGURE 4 is a half section of FIGURE 3 on the line 4—4.

FIGURES 5 to 8 illustrate a variant of the invention which is intended for unloading.

FIGURE 5 is a side elevation showing an unloading conveyer of the invention mounted on a dock and fully retracted.

FIGURE 6 is a view similar to FIGURE 5 showing the conveyer extended for positioning in a vehicle.

FIGURE 7 is a fragmentary side elevation of the channel shapes which support the conveyer section.

FIGURE 8 is a half section of FIGURE 7 on the line 8—8.

Describing in illustration but not in limitation and referring to the drawings:

The general prior practice in loading and unloading trucks and the like using gravity conveyers, has been to extend the conveyer from the loading dock to the truck or at least the tail gate, partially supporting the conveyer on the dock and particularly supporting it on the truck floor or tail gate. Due to the wide difference in truck floor heights, which sometimes vary considerably in different parts of the same truck, it is very difficult to provide proper support for a gravity conveyer on the truck without necessitating the introduction of improvised supporting means such as tressels, boxes and the like. Therefore, in some instance it has proved to be so inefficient to support a gravity conveyer that other less satisfactory loading and unloading means must have been adopted.

Efforts have been made in the past to adopt cantilever support from the dock for telescoping gravity conveyers, but such devices have been limited to two sections, and therefore the extent to which the conveyer can be elongated to enter the truck has been quite limited.

I have succeeded in producing conveyer designs which are free from this limitation, and permit the mounting of two, three or more telescoping sections in a much improved structure, all supported from one section which is suitably positioned on the dock.

One of the great advantages of the present invention is that first, second and third sections telescope, and when telescoped or extended they are all supported on one of the sections, each of the sections having gravity operating rollers which allow the object being conveyed to continue for the length of the conveyer.

In accordance with the present invention, as shown in the telescoping gravity loading conveyer of FIGURES 1 to 4, I provide a stationary first section 20 mounted on legs 21 which are suitably anchored as by bolts to the floor of a dock or the like 2. The first section 20 mounts cantilever fashion a second section 23 which is shown telescoped in FIGURE 1 and extending in FIGURE 2. The second section 23 mounts a third section 24 which is shown telescoped in FIGURE 1 and extended in FIGURE 2.

The first section 20 suitably comprises a base 25 which is secured to the legs, and which has carried at the sides channel shapes 26 which run the full length of the section, and in telescoping position surround both of the other sections. Each of the shapes comprises in effect two integral oppositely facing channels, which have one common flange. The lower channel has a bottom flange 27 which is suitably secured to the base 25, a web 28 and an intermediate flange 30. The upper channel portion comprises the intermediate flange 30, a web 31 and a top flange 32.

It will be evident that while the lower channel faces inward the upper channel is facing outward.

The support of the first section rollers may be of any suitable type but suitably comprises a stationary axle 33 which is secured as by riveting at the end 34 in the web 31 of the top channel and which supports the interior race of antifriction bearings 35 at the opposite ends, the outer races of which support the conveyer rollers 36. While it is immaterial from the standpoint of the present invention whether continuous rollers or skate wheel rollers are used, I have chosen for convenience to show continuous rollers in FIGURE 4.

On the lower channels near the upper ends at suitably spaced points are mounted bearing blocks 37, which position stub shafts 38 which are mounted by nuts 40 and at their inner ends journal antifriction bearing rollers 41 of which two are provided on each side spaced near the forward end.

The second section 23 of the conveyor comprises a base 42 which is suitably connected to lower channel portions 43 of a double channel element 44 which runs the full length of the second section. The lower channel portion comprises a bottom flange 45 which is suitably united to the base, a web 46, and an intermediate flange 47 which is common to both the lower channel and the upper channel. The upper channel 48 comprises an intermediate flange 47, a web 50 and an upper flange 51. The upper portion of the intermediate flange 47 and the lower portion of the upper flange 51 guide respectively the lower and upper portions of the rollers 41 and thus provide in effect a defined track which, with the cooperating rollers 41 at the opposite side working in the opposite counterpart channel member define the upward, downward and lateral movements of the second section.

The second section has suitable axles 33' which are mounted as by riveting at 34' on the webs of the upper channels 48, and these receive at the opposite ends the inner races of antifriction bearings 35' which suitably support conveyer rollers 36'.

The second section has mounted in the upper part of the web 46 of the lower channels, bearing blocks 52 which mount stub shafts 53 which are held in place by nuts 54 and at the inner ends carry antifriction bearing rollers 55 which are positioned in spaced relation near the forward end of the second section on each side.

The third section comprises a base 56 which is suitably connected to the lower flange 57 of the lower channel 58 of a side supporting channel shape 60. The side supporting channel has an intermediate flange 61, which is common to the oppositely facing upper and lower channels. The upper channel 62 consists of intermediate flange 61, a web 63 and an upper flange 64. The intermediate flange 61 and the upper flange 64 are respectively engaged by the bottom and top of the rollers 55 and form a defining vertically supporting and laterally guiding track for the third section.

The third section rollers are suitably supported on axles $33^2$ which are suitably connected as by rivets $34^2$ to the webs of the upper channels, and the axles in turn engage the inner races of antifriction bearings $35^2$ at the ends which in turn support the ends of rollers $36^2$ in the conveyer.

The second section has at the opposite ends stops 65 which intrude into the path of rollers 41 and limit motion in retracted and extended position, and the third section has at the opposite ends stops 66 which intrude into the path of rollers 55 and limit motion in extended and retracted position.

In operation of the device of FIGURES 1 to 4, it will be evident that it will normally be in retracted position when the vehicle is moving in or out at the particular point along the dock. When the vehicle is placed for loading, the conveyer is then extended by pulling out the third and second sections, either or both, to the extent required to give the desired length. In the extended position as shown in FIGURE 2, the support of each of the sections more remote from the dock is provided by the rollers, which in turn also act as antifriction devices and permit easy extension and retraction.

The form of FIGURES 5 to 8 is intended for unloading and involves an exactly similar construction except that the sections are reversed, the second section being relatively above the first section in the unloading form and the second section being relatively below the first section in the loading form.

The form of FIGURES 5 to 8 includes first section 20' which is mounted on the dock as previously described, the second section 23' which is supported thereon and suitably positioned above, and a third section 24' which is mounted on the second section and suitably positioned above the second section.

These sections are shown fully retracted in FIGURE 5 and fully extended in FIGURE 6. The first section 20' may be suitably identical with the first section already described and this is one advantage of the invention because the same first section can be used to mount either a loading or unloading conveyer.

The second section includes side supporting shapes 67 which are positioned outside the shapes 26 of the first section, and which include lower webs 68, lower flanges 70 which provides stiffening, and an intermediate flange 71, which cooperates also with an upper channel section 72, the upper channel section 72 comprises the intermediate flange 71, a web 73 and a top flange 74. The construction and support of the second section rollers is conveniently the same as the second section rollers in the form of FIGURES 1 to 4, and therefore need not be separately described. The mounting of the second section is by means of antifriction bearing rollers 75, which guide between intermediate flange 30 and top flange 32 of the first section and are supported by stub shafts 38 on bearing blocks 37' at the upper portion of the webs 68 of the second section, and are secured by nuts 40. The rollers are suitably positioned in spaced relation near the rear end of the second section on each side.

The third section in the form of FIGURES 5 to 8 involves shapes 76 at the respective sides which include a bottom web 77, a bottom flange 78, a top web 80 and top flange 81. Further support is provided by angles 82 which are provided for bearing support on the outside of web 77 and the flange 78. The third section, which is on top of the other sections, is supported by antifriction bearing rollers 83 which ride between flanges 71 and 74 of the channel 72 of the second section, and are supported by suitable shafts 84 which pass through openings in the web 77 and the angles 82 and are anchored by nuts 85. The rollers 83 are in spaced relation near the rear end of the third section 34' at each side. The support of the conveyer rollers of the third section is the same as in the form of FIGURES 1 to 4 and will not be separately described.

It will be evident that in the form of FIGURES 5 to 8 the sections can be fully retracted for manipulation of vehicles, and when a vehicle is in place for unloading, the second and third sections can be fully pulled out to any desired extent.

The stops, though differently placed, are similar in function as shown in FIGURE 6 to the stops used in the form previously described. In FIGURE 6, the second section has at the oppoiste ends stops 65 which intrude into the path of rollers 83 and limit motion in both retracted and extended position. The first section has at the opposite ends stops 66 which intrude into the path of rollers 75 and limit motion in extended and retracted positions.

The material to be conveyed passes from one conveyer section to a lower section in both loading and unloading.

In view of my invention and disclosure variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention what I claim as new and desire to secure by Letters Patent is:

1. In a telescoping gravity conveyor, a first section comprising spaced parallel outwardly directed channels at each side thereof, conveyor means suspended between said channels, and a web extending from one of the flanges on each channel, a second section comprising spaced parallel outwardly directed channels, conveyor means suspended between the channels of said second section, a web extending from one of the flanges on each channel of said second section, and a plurality of rollers on the webs of one of the sections riding the upper and lower flanges of the channel at each side of the other section, wherein the transverse distance between the chanels of the first section is equal to the transverse distance between the channels of the second section and the second section telescopes with respect to the first section.

2. A conveyor of claim 1, wherein the webs at the side of each section are joined by a support.

3. In a telescoping gravity conveyor, a first section comprising spaced parallel outwardly directed channels at each side thereof, conveyor means suspended between the channels, and a web extending from one of the flanges on each channel, a second section comprising spaced parallel outwardly directed channels, conveyor means suspended between the channels of said second section, and a web extending from one of the flanges on each channel of said second section, a third section comprising spaced parallel outwardly directed channels, conveyor means suspended between the channels of said third section and a web extending from one of the flanges on each channel of said third section, a plurality of rollers on the webs of the first section riding upper and lower flanges of the channels at each side of the second section, and a plurality of rollers on the webs of the second section riding the upper and lower flanges of the channels at each side of the third section, wherein the transverse distance between the channels of each section is equal, and the third section telescopes into the second section and the second section telecopes into the first section.

4. A conveyor of claim 3, wherein the webs at the side of each section are joined by a support.

5. In a telescoping gravity conveyor, a first section comprising spaced parallel outwardly directed channels at each side thereof, conveyor means suspended between the channels and a web extending from one of the flanges on each channel, a second section comprising spaced parallel outwardly directed channels, conveyor means suspended between the channels of said second section and a web extending from one of the flanges on each channel of said section, a third section comprising spaced parallel outwardly directed channels, conveyor means suspended between the channels of said third section and a web extending from one of the flanges on each channel of said third section, a plurality of rollers on the webs of the second section riding the upper and lower flanges of the channels at each side of the first section, and a plurality of rollers on the webs of the third section riding the upper and lower flanges of the channels at each side of the second section, wherein the transverse distance between the channels of each section is equal to the transverse distance between the channels of each of the other sections, and the third section telescopes with respect to the second section and the second section telescopes with respect to the first section.

6. A conveyor of claim 5, wherein the webs at the side of the first section are joined by a support.

7. A telescopic cantilever conveyer assembly comprising a pair of elongate conveyer sections, each of said sections comprising a pair of elongate spaced parallel side rails each having a vertical web and horizontal flanges projecting transversely outwardly from the upper and lower edges of the web, a plurality of rotatable conveying elements mounted upon and extending between the side rail webs to define a conveying surface of each of said sections, the transverse spacing between the side rail webs of both of said sections being equal whereby the widths of the conveying surfaces of both sections are equal, and roller means mounted upon and spaced vertically from the side rails of one of said sections to project transversely inwardly between the horizontal flanges of the other of said sections to couple the two sections to each other for guided longitudinal movement relative to each other in vertical alignment with each other.

8. A telescopic cantilever conveyer as defined in claim 7 wherein said roller means are mounted upon the first of said sections and are disposed in rolling engagement with the lower surfaces of the upper horizontal flanges of the second of said sections to suspend the second of said sections vertically below the first of said sections.

9. A telescopic cantilever conveyer assembly as defined in claim 7 wherein said roller means are mounted upon the second of said sections and are disposed in rolling engagement with the upper surfaces of the lower horizontal flanges of the first of said sections to support said second of said sections vertically above the first of said sections.

References Cited in the file of this patent

UNITED STATES PATENTS

| | | |
|---|---|---|
| 2,609,076 | Brent | Sept. 2, 1952 |
| 2,613,788 | McLaughlin | Oct. 14, 1952 |
| 2,627,960 | Eberle | Feb. 10, 1953 |
| 2,815,849 | Zumbrunnen | Dec. 10, 1957 |